(12) United States Patent
Ji et al.

(10) Patent No.: US 7,306,337 B2
(45) Date of Patent: Dec. 11, 2007

(54) CALIBRATION-FREE GAZE TRACKING UNDER NATURAL HEAD MOVEMENT

(75) Inventors: Qiang Ji, Cohoes, NY (US); Zhiwei Zhu, Troy, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 856 days.

(21) Appl. No.: 10/787,359

(22) Filed: Feb. 26, 2004

(65) Prior Publication Data

US 2004/0174496 A1  Sep. 9, 2004

Related U.S. Application Data

(60) Provisional application No. 60/452,349, filed on Mar. 6, 2003.

(51) Int. Cl.
*A61B 3/14* (2006.01)
*G06K 9/00* (2006.01)

(52) U.S. Cl. ..................... 351/209; 382/103
(58) Field of Classification Search ................ 351/209, 351/205, 206, 208, 210, 211, 221, 246; 382/103, 382/117, 128, 199, 288, 289
See application file for complete search history.

(56) References Cited

U.S. PATENT DOCUMENTS

| | | | |
|---|---|---|---|
| 3,462,604 A | 8/1969 | Mason | |
| 3,712,716 A | 1/1973 | Cornsweet | |
| 4,595,990 A | 6/1986 | Garwin et al. | |
| 4,836,670 A | 6/1989 | Hutchinson | |
| 4,950,069 A | 8/1990 | Hutchinson | |
| 4,973,149 A | 11/1990 | Hutchinson | |
| 4,974,010 A | 11/1990 | Cleveland | |
| 5,204,703 A | 4/1993 | Hutchinson et al. | |
| 5,231,674 A * | 7/1993 | Cleveland et al. | .......... 382/117 |
| 5,471,542 A * | 11/1995 | Ragland | .......... 382/128 |
| 5,576,780 A | 11/1996 | Yancey | |
| 5,598,261 A | 1/1997 | Duncan et al. | |
| 5,861,940 A | 1/1999 | Robinson et al. | |
| 5,963,300 A | 10/1999 | Horwitz | |

(Continued)

OTHER PUBLICATIONS

Emanuel Parzen, On Estimation of a Probability Density Function and Mode, The Annals of Mathematical Statistics, vol. 33, No. 3 (Sep. 1962), 1065-1076.

(Continued)

*Primary Examiner*—Ricky Mack
*Assistant Examiner*—Tuyen Tra
(74) *Attorney, Agent, or Firm*—Schmeiser, Olson & Watts

(57) ABSTRACT

A method and computer system for tracking eye gaze. A camera is focused on an eye of subject viewing a gaze point on a screen while directing light toward the eye. Eye gaze data pertaining to a glint and pupil image of the eye in an image plane of the camera is sampled. Eye gaze parameters are determined from the eye gaze data. The determined eye gaze parameters include: orthogonal projections of a pupil-glint displacement vector, a ratio of a major semi-axis dimension to a minor semi-axis dimension of an ellipse that is fitted to the pupil image in the image plane, an angular orientation of the major semi-axis dimension in the image plane, and mutually orthogonal coordinates of the center of the glint in the image plane. The gaze point is estimated from the eye gaze parameters.

26 Claims, 13 Drawing Sheets

U.S. PATENT DOCUMENTS

| | | |
|---|---|---|
| 6,152,563 A | 11/2000 | Hutchinson et al. |
| 6,211,971 B1 | 4/2001 | Specht |
| 6,257,722 B1 | 7/2001 | Toh |
| 6,283,954 B1 | 9/2001 | Yee |
| 6,334,683 B2 | 1/2002 | Apple et al. |
| 6,393,133 B1 | 5/2002 | Breed et al. |
| 6,393,136 B1 | 5/2002 | Amir et al. |
| 6,397,137 B1 | 5/2002 | Alpert et al. |
| 6,456,262 B1 | 9/2002 | Bell |
| 6,542,081 B2 | 4/2003 | Torch |
| 6,578,962 B1 | 6/2003 | Amir et al. |
| 6,598,971 B2 | 7/2003 | Cleveland |
| 6,608,615 B1 | 8/2003 | Martins |
| 6,659,611 B2 | 12/2003 | Amir et al. |
| 2002/0063850 A1 | 5/2002 | Barry et al. |
| 2003/0007687 A1 | 1/2003 | Nesterov et al. |
| 2003/0098954 A1* | 5/2003 | Amir et al. ............ 351/210 |

OTHER PUBLICATIONS

Yoshinobu Ebisawa, Improved Video-Based Eye-Gaze Detection Method, IEEE Transactions on Instrumentation and Measurement, vol. 47, No. 47, No. 4, Aug. 1998, pp. 948-955.

Ohno et al., Free Gaze: A Gaze Tracking System for Everyday Gaze Interaction, NTT Communication Science Laboratories, NTT Corporation, 8 pages.

Zhe et al., Real-Time Eye Detection and Tracking Under Various Light Conditions, pp. 139-144.

Donald F. Specht, A General Regression Neural Network, IEEE Transactions on Neural Networks, vol. 2, No. 6, Nov. 1991, pp. 568-576.

* cited by examiner

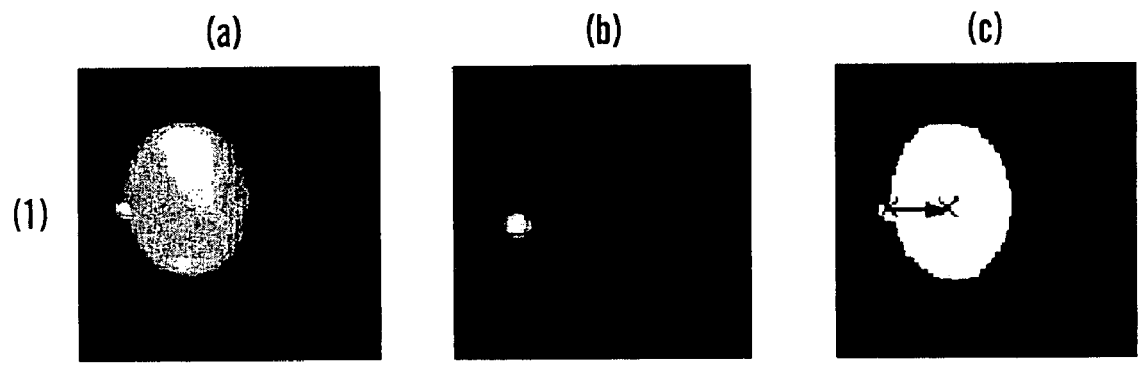
FIG. 7A  FIG. 7B  FIG. 7C
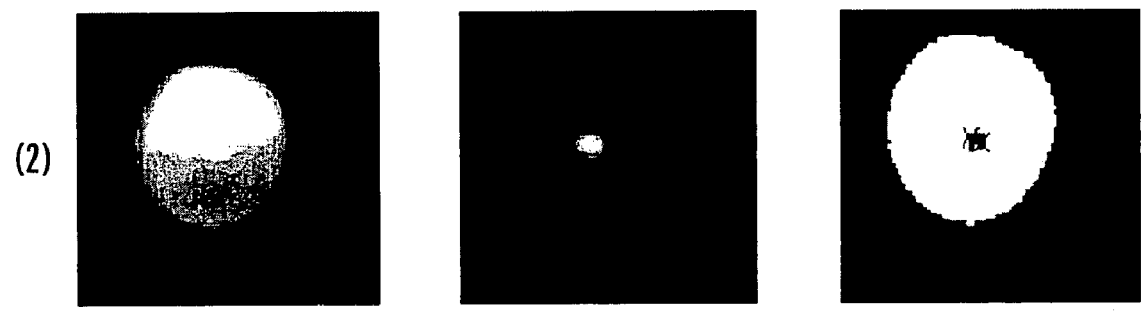
FIG. 7D  FIG. 7E  FIG. 7F
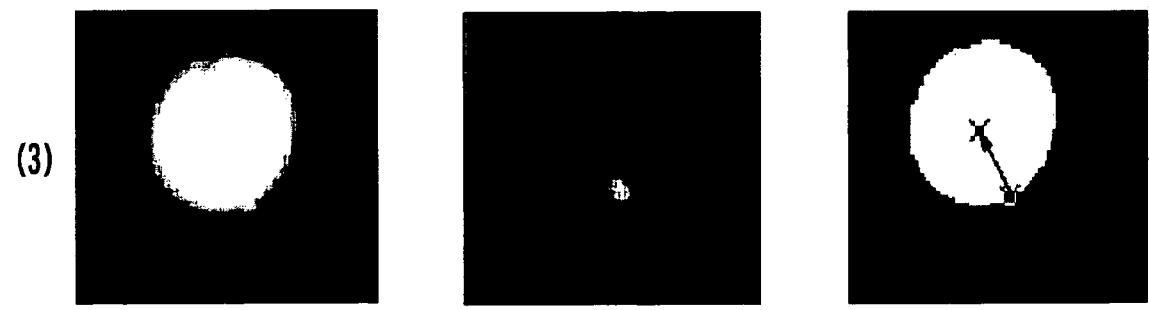
FIG. 7G  FIG. 7H  FIG. 7I

(FACING FRONT)

(FACING RIGHT)

(FACING LEFT)

CALIBRATION-FREE GAZE TRACKING UNDER NATURAL HEAD MOVEMENT

RELATED APPLICATION

The present invention claims priority to U.S. Provisional Application No. 60/452,349; filed Mar. 6, 2003, which is incorporated herein by reference in its entirety.

BACKGROUND OF THE INVENTION

1. Technical Field

A method and computer system for tracking eye gaze such that translational and rotational head movement are permitted.

2. Related Art

Gaze determines a subject's current line of sight or fixation point. The fixation point is defined as the intersection of the line of sight with the surface of the object being viewed (such as the screen of computer). Gaze may be used to interpret the subject's intention for non-command interactions and to enable fixation dependent accommodation and dynamic depth of focus. The potential benefits for incorporating eye movements into the interaction between humans and computers are numerous. For example, knowing the location of the subject's gaze may help a computer to interpret the subject's request and possibly enable a computer to ascertain some cognitive states of the subject, such as confusion or fatigue.

The direction of the eye gaze can express the interests of the subject and is a potential porthole into the current cognitive processes. Communication through the direction of the eyes is faster than any other mode of human communication. In addition, real time monitoring of gaze position permits the introduction of display changes that are contingent on the spatial or temporal characteristics of eye movements. Such methodology is referred to as the gaze contingent display paradigm. For example, gaze may be used to determine one's fixation on the screen, which can then be used to infer the information of interest to the subject. Appropriate actions can then be taken such as increasing the resolution or increasing the size of the region where the subject fixates. Another example is to economize on bandwidth by putting high-resolution information only where the subject is currently looking. Gaze tracking is therefore important for Human Computer Interaction (HCI).

Existing techniques for eye gaze tracking can be divided into video-based techniques and non-video-based techniques. The non-video-based methods typically use special contacting devices attached to the skin or eye to obtain the subject's gaze. Thus, the non-video-based methods are intrusive and interfere with the subject. In contrast, video-based gaze tracking methods have the advantage of being unobtrusive and comfortable for the subject during the process of gaze estimation. Unfortunately, current video-based gaze tracking methods have significant shortcomings. For example, some existing techniques which relate gaze to head orientation lack sufficient accuracy. Other existing techniques which relate gaze to eye orientation require a static head which is significant constraint imposed on the subject. Another serious problem with the existing eye and gaze tracking systems is the need to perform a rather cumbersome calibration process for each individual.

Accordingly, there is a need for a gaze tracking method which overcomes or mitigates the disadvantages of existing gaze tracking techniques.

SUMMARY OF THE INVENTION

The present invention provides a method for tracking gaze, comprising the steps of:

focusing a single camera on an eye of subject viewing a gaze point on a screen while directing light toward the eye;

sampling eye gaze data pertaining to a glint and pupil image of the eye in an image plane of the single camera;

determining eye gaze parameters from the eye gaze data, wherein the eye gaze parameters include: $\Delta x$, $\Delta y$, $r$, $\theta$, $g_x$, and $g_y$, wherein $\Delta x$ and $\Delta y$ are orthogonal projections of a pupil-glint displacement vector directed from the center of the pupil image to the center of the glint in the image plane, wherein $r$ is a ratio of a major semi-axis dimension to a minor semi-axis dimension of an ellipse that is fitted to the pupil image in the image plane, wherein $\theta$ is an angular orientation of the major semi-axis dimension in the image plane, and wherein $g_x$, and $g_y$ are mutually orthogonal coordinates of the center of the glint in the image plane; and estimating the gaze point from the eye gaze parameters.

The present invention provides a computer system comprising a processor and a computer readable memory unit coupled to the processor, said memory unit containing instructions that when executed by the processor implement a method for tracking gaze, said method comprising the computer implemented steps of:

processing eye gaze data pertaining to a glint and pupil image of an eye in an image plane of a single camera, wherein the eye is comprised by a subject, and wherein the single camera is focused on the eye while the eye is viewing a gaze point on a screen and while light is directed toward the eye;

determining eye gaze parameters from the eye gaze data, wherein the eye gaze parameters include: $\Delta x$, $\Delta y$, $r$, $\theta$, $g_x$, and $g_y$, wherein $\Delta x$ and $\Delta y$ are orthogonal projections of a pupil-glint displacement vector directed from the center of the pupil image to the center of the glint in the image plane, wherein $r$ is a ratio of a major semi-axis dimension to a minor semi-axis dimension of an ellipse that is fitted to the pupil image in the image plane, wherein $\theta$ is an angular orientation of the major semi-axis dimension in the image plane, and wherein $g_x$, and $g_y$ are mutually orthogonal coordinates of the center of the glint in the image plane; and estimating the gaze point from the eye gaze parameters.

The present invention provides a gaze tracking method which overcomes or mitigates the disadvantages of existing gaze tracking techniques.

BRIEF DESCRIPTION OF THE DRAWINGS

FIGS. 7A-7I depict images showing the relative spatial relationship between glint and the bright pupil center, in accordance with embodiments of the present invention.

DETAILED DESCRIPTION OF THE INVENTION

The direction of a person's gaze is determined by two factors: the orientation of the face (face pose) and the orientation of eye (eye pose). Face pose determines the global direction of the gaze, while eye gaze determines the local direction of the gaze. Global gaze and local gaze together determine the final gaze of the person. The present invention provides a gaze estimation video-based approach that accounts for both the local gaze computed from the eye pose and the global gaze computed from the face pose.

The gaze estimation technique of the present invention advantageously allows natural head movement while estimating gaze accurately. In addition, while this gaze estimation technique requires an initial calibration, the technique may be implemented as calibration free for individual subjects. New subjects, or the existing subjects who have moved their heads, do not need to undergo a personal gaze calibration before using the gaze tracker of the present invention. Therefore, the gaze tracker of the present invention can perform robustly and accurately without calibration and under natural head movements.

Figure 1:
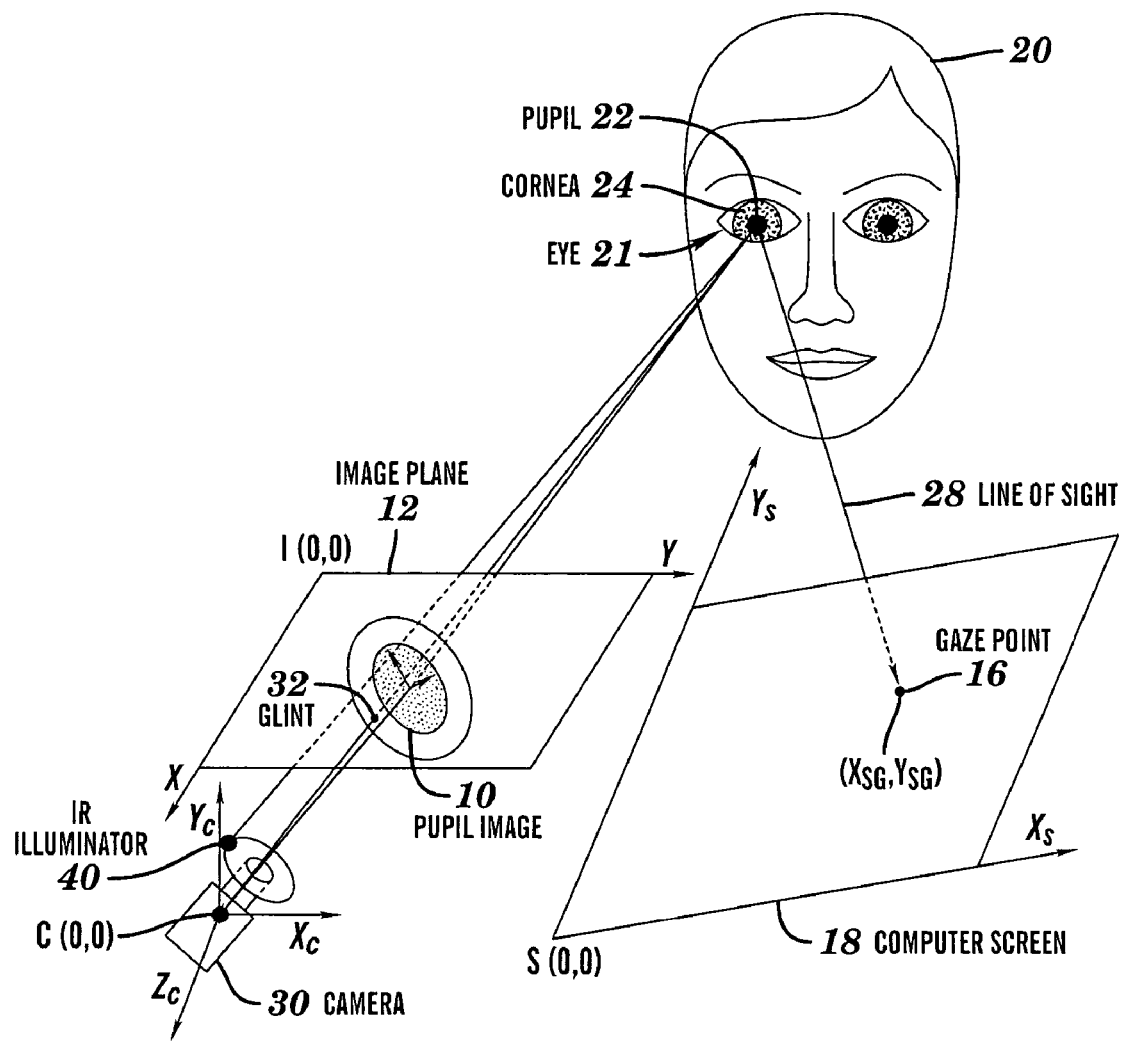
FIG. 1 describes geometric relationships between a pupil image on an image plane and a gaze point on a computer screen, in accordance with embodiments of the present invention.

FIG. 1 describes geometric relationships between a pupil image 10 on an image plane 12 and a gaze point 16 on a computer screen 18, in accordance with embodiments of the present invention. The screen 18 may be, inter alia, a computer screen, a television screen, etc. FIG. 1 shows a head 20 and eye 21 of a subject or person 20. The eye 21 includes a cornea 24 and an associated pupil 22. The subject 20 is viewing the gaze point 16 on the screen 18 along a line of sight 28 from the pupil 22 to the gaze point 16. A camera 30, using an infrared (IR) illuminator 40 is recording the pupil image 10 of the pupil 22 on the image plane 12. The image plane 12 also records the glint 32. The glint 32 is a small bright spot near the pupil image 10, wherein the glint 32 results from light reflection off the surface of the cornea 24. Thus, a sequence of image frames are stored, wherein each image frame contains the pupil image 10 and the glint 32. The present invention determines and uses a mapping function which maps the geometric eye parameters derived from the image frame into screen coordinates on the screen 18.

Several coordinate systems are defined in FIG. 1. A coordinate system fixed in the camera 30 has an origin $C(0,0)$ and orthogonal axes $X_c$, $Y_c$, and $Z_c$. A coordinate system fixed in the screen 18 has an origin $S(0,0)$ and orthogonal axes $X_s$ and $Y_s$, wherein the $X_s$ and $Y_s$ coordinates of the gaze point 16 are $X_{SG}$ and $Y_{SG}$, respectively. A coordinate system fixed in the image plane 12 has an origin $I(0,0)$ and orthogonal axes X and Y.

Figure 2:
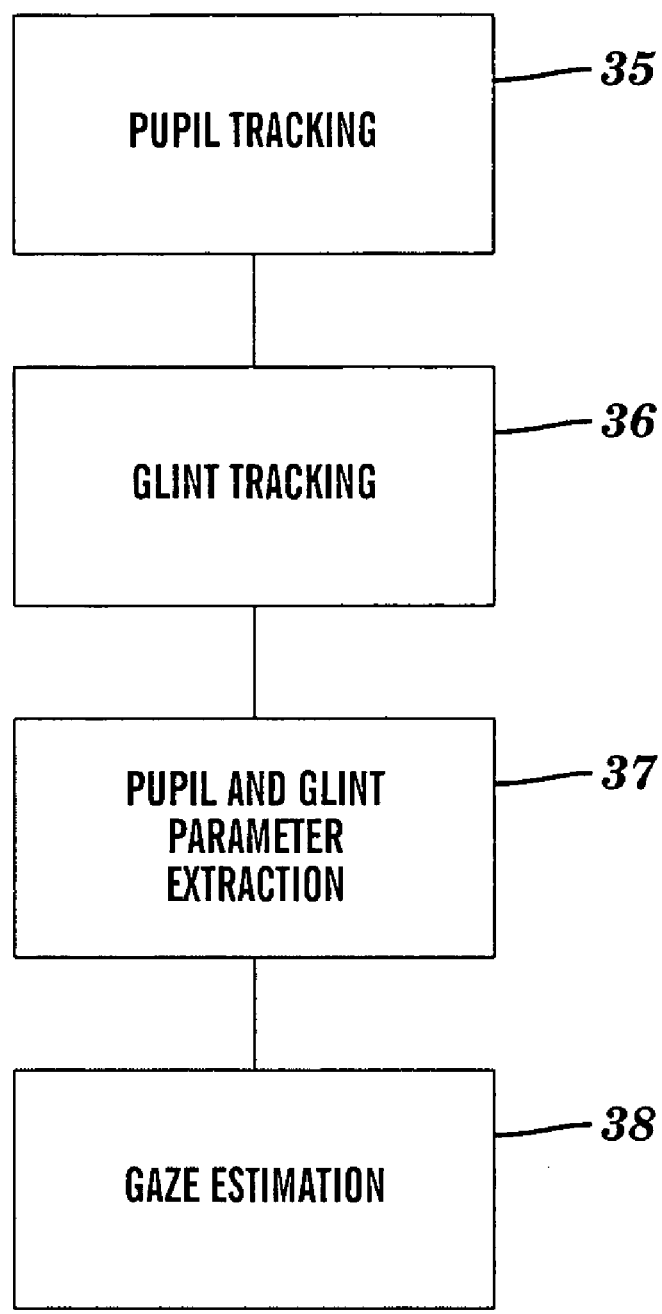
FIG. 2 is a flow chart depicting sequential steps of the gaze tracking methodology of the present invention.

FIG. 2 is a flow chart depicting sequential steps 35-38 of the gaze tracking methodology of the present invention. Step 35 comprises tracking the pupils of the eyes. Step 36 comprises tracking the glint. Step 37 extracts pupil and glint parameters from the tracked pupil and glint. Step 38 estimates gaze in terms of screen coordinates from the extracted pupil and glint parameters. The gaze estimation step 38 presumes that a gaze calibration has been performed to determine the mapping to be used step 38. The details of the gaze calibration procedure will be described infra.

Figure 3:
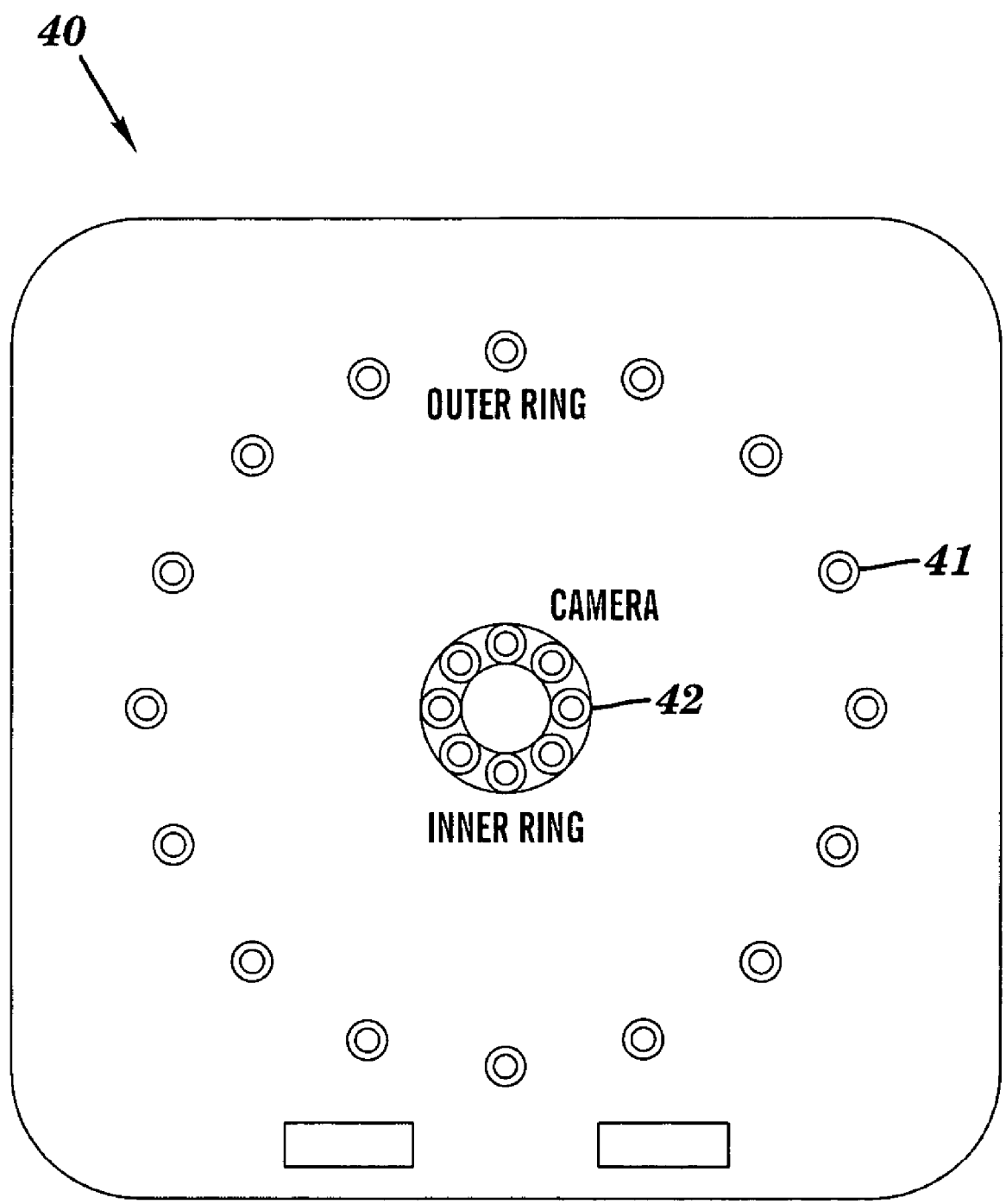
FIG. 3 illustrates an infrared (IR) illuminator, in accordance with embodiments of the present invention.

The gaze tracking starts with the tracking of pupils through use of infrared LEDs that operate at, inter alia, a power of 32 mW in a wavelength band 40 nm wide at a nominal wavelength of 880 nm. FIG. 3 illustrates the IR illuminator 32 of FIG. 1, in accordance with embodiments of the present invention. The IR illuminator 32 comprises two concentric IR rings, namely an outer ring 41 and an inner ring 42, and an optical band-pass filter. A dark and a bright pupil image is obtained by illuminating the eyes with IR LEDs located off the outer IR ring 41 and on the optical axis at the inner IR ring 42, respectively. To further improve the quality of the image and to minimize interference from light sources other than the IR illuminator, the optical band-pass filter is used, which has a wavelength pass band only 10 nm wide. The band-pass filter has increased the signal-to-noise ratio significantly, as compared with not using the band-pass filter.

Pupils detection and tracking start with pupils detection in the initial frames, followed by tracking. The pupil detection is accomplished based on both the intensity of the pupils (in accordance with the bright and dark pupils as shown in FIG. 6, described infra) and on the appearance of the eyes using a support vector machine (SVM). The use of support vector machine avoids falsely identifying a bright region as a pupil.

Figure 4:
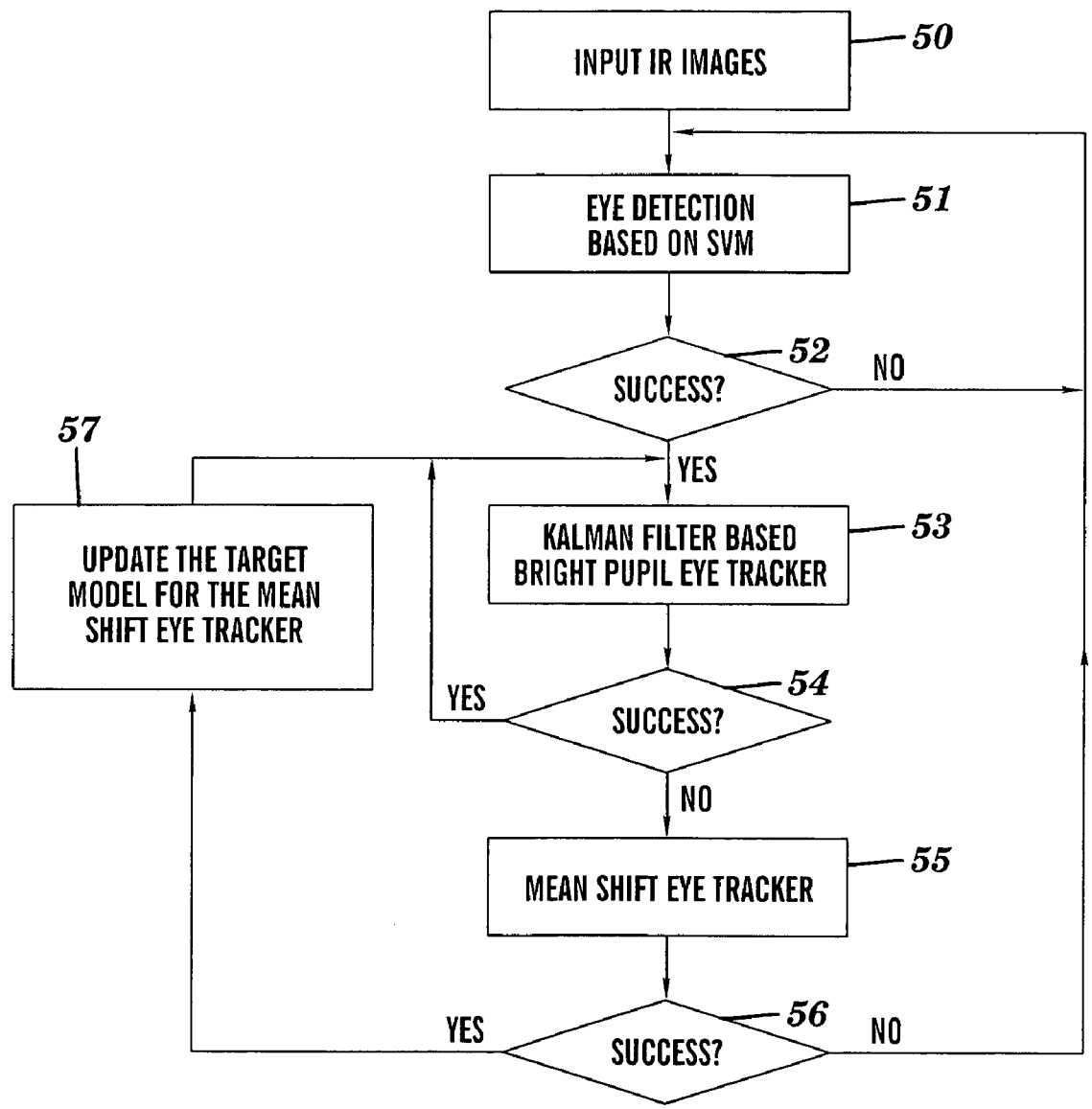
FIG. 4 summarizes the pupil detection and tracking algorithm of the present invention.

FIG. 4 summarizes the pupil detection and tracking algorithm of the present invention.

Step 50 of FIG. 4 provides input IR images. In step 51, candidates of pupils are first detected from the difference image, which results from subtracting the dark pupil image from the bright pupil image. The algorithm attempts to validate the pupil candidates, using the SVM, to remove spurious pupil candidates. Step 52 determines whether the pupil candidates have been successfully validated in step 51. If the pupil candidates have not been successfully validated, then the algorithm iteratively loops back to step 51 until the pupil candidates have been successfully validated. If step 52 determines that the pupil candidates have been successfully validated, then step 53 is next executed.

In step 53, the detected pupils in the subsequent frames are detected efficiently via tracking with Kalman filtering. The Kalman filtering is used for analysis of the subsequent frames, based on utilizing pupils' positions determined in the previous frame to predict pupils' positions in the current frame. The use of Kalman filtering significantly limits the search space, thereby increasing the efficiency of pupils detection in the current frame. The Kalman filtering tracking is based on pupil intensity. To avoid Kalman filtering going awry due to the use of only intensity, the Kalman filtering is augmented by mean-shift tracking. The mean-shift tracking tracks an object based on its intensity distribution. Therefore, step 54 determines whether the Kalman filtering tracking of the current frame based on pupil intensity was successful.

If step 54 determines that the Kalman filtering tracking based on pupil intensity was successful for the current frame, then the detection and tracking of the current frame is finished and the algorithm proceeds to process the next frame in the Kalman filtering step 53.

If step 54 determines that the Kalman filtering tracking based on pupil intensity was not successful for the current frame, then the algorithm applies mean-shift tracking in step 55. Step 56 determines whether the application of mean-shift tracking in step 55 was successful for the current frame.

If step 56 determines that the application of mean-shift tracking in was successful for the current frame, then the algorithm performs step 57, which updates the target model for the mean shift eye tracker, followed by processing the next frame in the Kalman filtering step 53.

If step 56 determines that the application of mean-shift tracking in was not successful for the current frame through use of Kalman filtering and mean-shift tracking, then the algorithm repeats step 51 so that the pupils in the current frame may be successfully tracked using the SVM.

Aspects of the eye detection and tracking procedure may be found in Zhu, Z; Fujimura, K. & Ji, Q. (2002), *Real-time eye detection and tracking under various light conditions*, Eye Tracking Research and Applications Symposium, 25-27 March, New Orleans, La. USA (2002).

Figure 5:
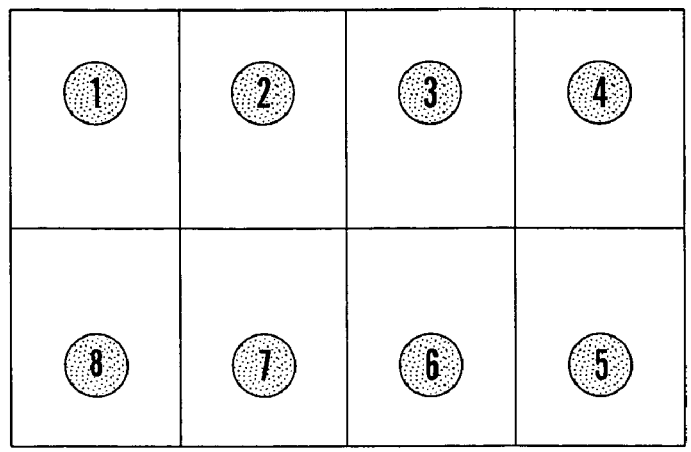
FIG. 5 depicts a region-quantized screen, in accordance with embodiments of the present invention.

The gaze estimation algorithm of the present invention has been applied to a situation in which a screen is quantized into 8 regions (4×2) as shown in FIG. 5, in accordance with embodiments of the present invention. Research results in conjunction with the region-quantized screen of FIG. 5 will be described infra.

The gaze estimation algorithm includes three parts: pupil-glint detection, tracking, and parameter extraction (i.e., steps 36 and 37 of FIG. 2), and gaze calibration and gaze mapping (i.e., step 38 of FIG. 2).

Figure 6A:
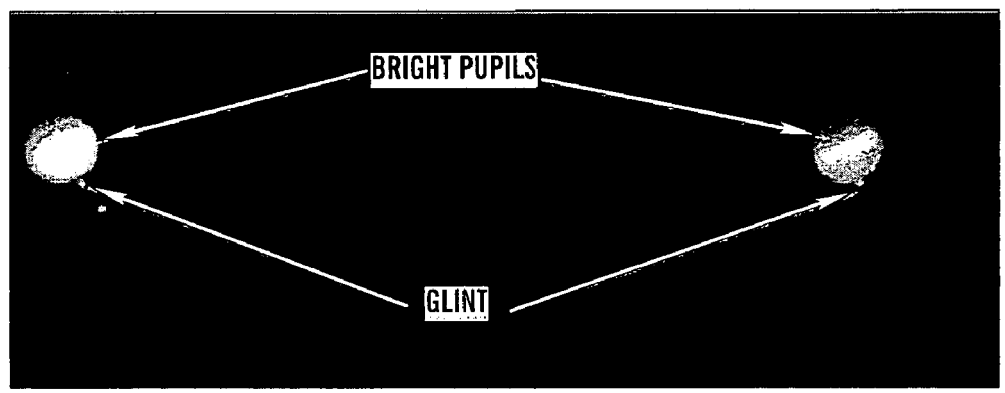
FIGS. 6A and 6B depict a bright and dark pupil effect, in accordance with embodiments of the present invention.
Figure 6B:
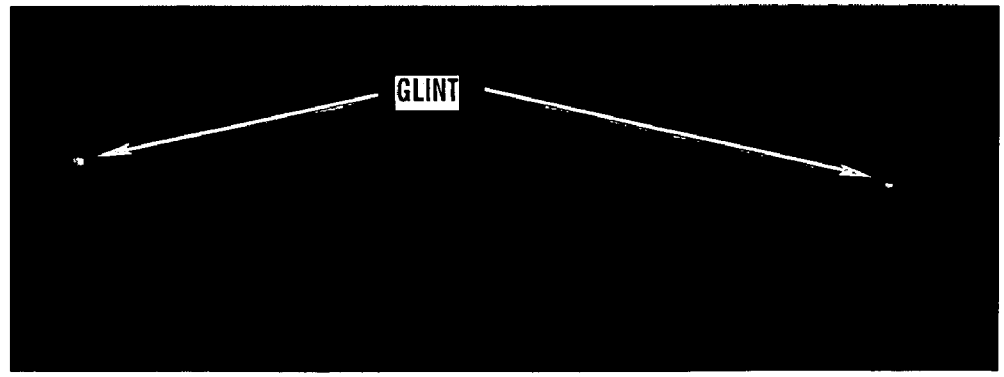

The pupil-glint detection and tracking of the present invention utilizes the IR illuminator 40 as discussed supra. To produce the desired pupil effects, the outer rings 41 and inner rings 42 are turned on and off alternately via a video decoder developed to produce the so-called bright and dark pupil effect as shown in FIGS. 6A and 6B, respectively, in accordance with embodiments of the present invention. Note that glint (i.e., the small brightest spot) appears on the images of both FIG. 6A and 6B. Given a bright pupil image, the pupil detection and tracking technique described supra can be directly utilized for pupil detection and tracking. The location of a pupil at each frame is characterized by its centroid. Algorithm-wise, glint can be detected much more easily from the dark image of FIG. 6B since both glint and pupil appear equally bright in FIG. 6A and sometimes overlap on the bright pupil image. On the other hand, in the dark image of FIG. 6B, the glint is much brighter than the rest of the eye image, which makes glint detection and tracking much easier. The pupil detection and tracking technique can be used to detect and track glint from the dark images.

The relative position between the glint and the pupil (i.e., the pupil-glint vector), together with other eye parameters as will be discussed infra, is subsequently mapped to screen coordinates of the gaze point (e.g., gaze point 16 in FIG. 1). Accordingly, FIGS. 7A-7I depict a 3×3 array of images showing the relative spatial relationship between glint and the bright pupil center, in accordance with embodiments of the present invention. FIGS. 7A-7I comprise 3 columns denoted as columns (a), (b), and (c) and three rows denoted as rows (1), (2), and (3). Row (1) depicts pupil and glint images when the subject 20 is looking leftward, relative to the camera 30 (see FIG. 1). Row (2) depicts pupil and glint images when the subject 20 is looking forward, relative to the camera 30. Row (3) depicts pupil and glint images when the subject 20 is looking upward and leftward, relative to the camera 30. Column (a) depicts bright pupil images. Column (b) depicts glint images. Column (c) depicts pupil-glint relationship images generated by superimposing the glint of column (b) to the thresholded bright pupil images of column (a). Hence, column (c) shows the detected glints and pupils.

The mapping function of eye parameters to screen coordinates (i.e., gaze points) may be determined via a calibration procedure. Thus, the calibration procedure determines the parameters for the mapping function given a set of pupil-glint vectors and the corresponding screen coordinates. The conventional approach for gaze calibration suffers from two shortcomings. The first shortcoming is that most of the mapping is assumed to be an analytical function of either linear or second order polynomial, which may not be reasonable due to perspective projection and the spherical surface of the eye. The second shortcoming is that another calibration is needed if the head has moved since last calibration, even for minor head movement. In practice, it is difficult to keep the head still (unless a support device like a chin rest is used) and the existing gaze tracking methods will produce an incorrect result if the head moves, even slightly. In light of the second shortcoming, the present invention incorporates head movement into the gaze estimation procedure as will be discussed infra in conjunction with FIGS. 8A-8C.

Figure 8A:
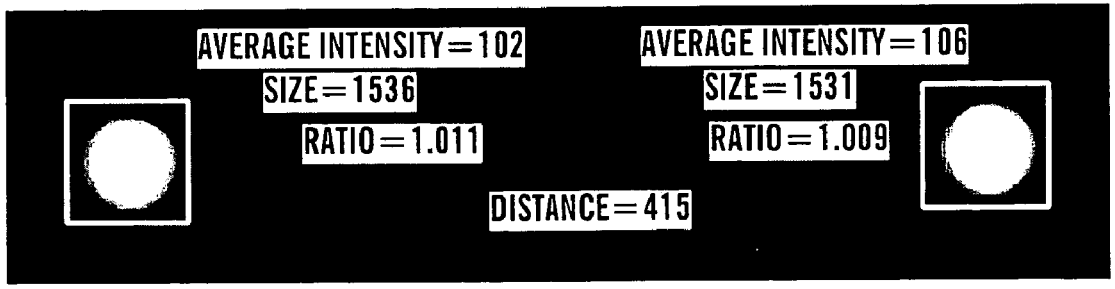
FIGS. 8A-8C depicts changes of pupil images under different face orientations from pupil tracking experiments, in accordance with embodiments of the present invention.
Figure 8B:
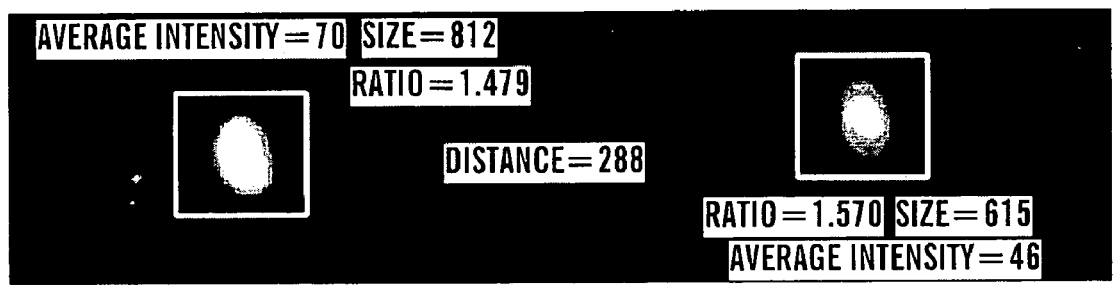
Figure 8C:
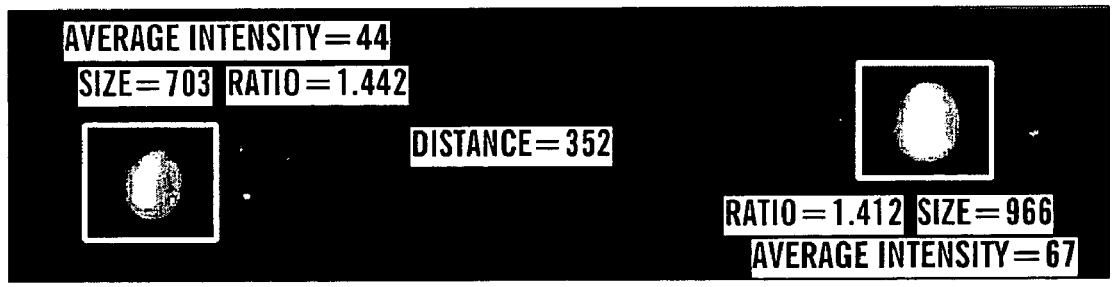

FIGS. 8A-8C depict changes of pupil images under different face orientations from pupil tracking experiments, in accordance with embodiments of the present invention. Each of FIGS. 8A-8C shows the two pupil images of the subject in the image plane 12 of FIG. 1. FIGS. 8A-8C illustrate that the pupil appearances vary with different poses. In FIG. 8A, the subject 20 is facing frontwise, relative to the camera 30 (see FIG. 1). In FIG. 8B, the subject 20 is facing rightward, relative to the camera 30. In FIG. 8C, the subject 20 is facing leftward, relative to the camera 30. The parameters in FIGS. 8A-8C, as measured in the image plane 12 of FIG. 1, are defined as follows: "distance" denotes an inter-pupil distance (i.e., the spatial separation between the respective centroids of the two pupils of the subject) in units of pixels; "ratio" is the ratio of the major axis dimension to the minor axis dimension of the ellipse of the pupil; "size" is a pupil area size in units of pixels; and "average intensity" is the average intensity of pupil illumination in units of grey levels.

An analysis of the face orientation experimental data, including an analysis of FIGS. 8A-8C, shows that there exists a direct correlation between three-dimensional face pose (i.e., face orientation) and properties such as pupil size, inter-pupil distance, pupil shape, and pupil ellipse orientation. The results of the analysis are as follows:

(1) the inter-pupil distance decreases as the face rotates away from the frontal direction;

(2) the ratio between the average intensity of two pupils either increases to over 1 or decreases to less than 1 as the face rotates away from the frontal direction or rotates up/down;

(3) the shapes of two pupils become more elliptical as the face rotates away from the frontal direction or rotates up/down;

(4) the sizes of the pupils decrease as the face rotates away from the frontal direction or rotates up/down; and (5) the orientation of the pupil ellipse changes as the face rotates around the camera optical axis.

Figure 9:
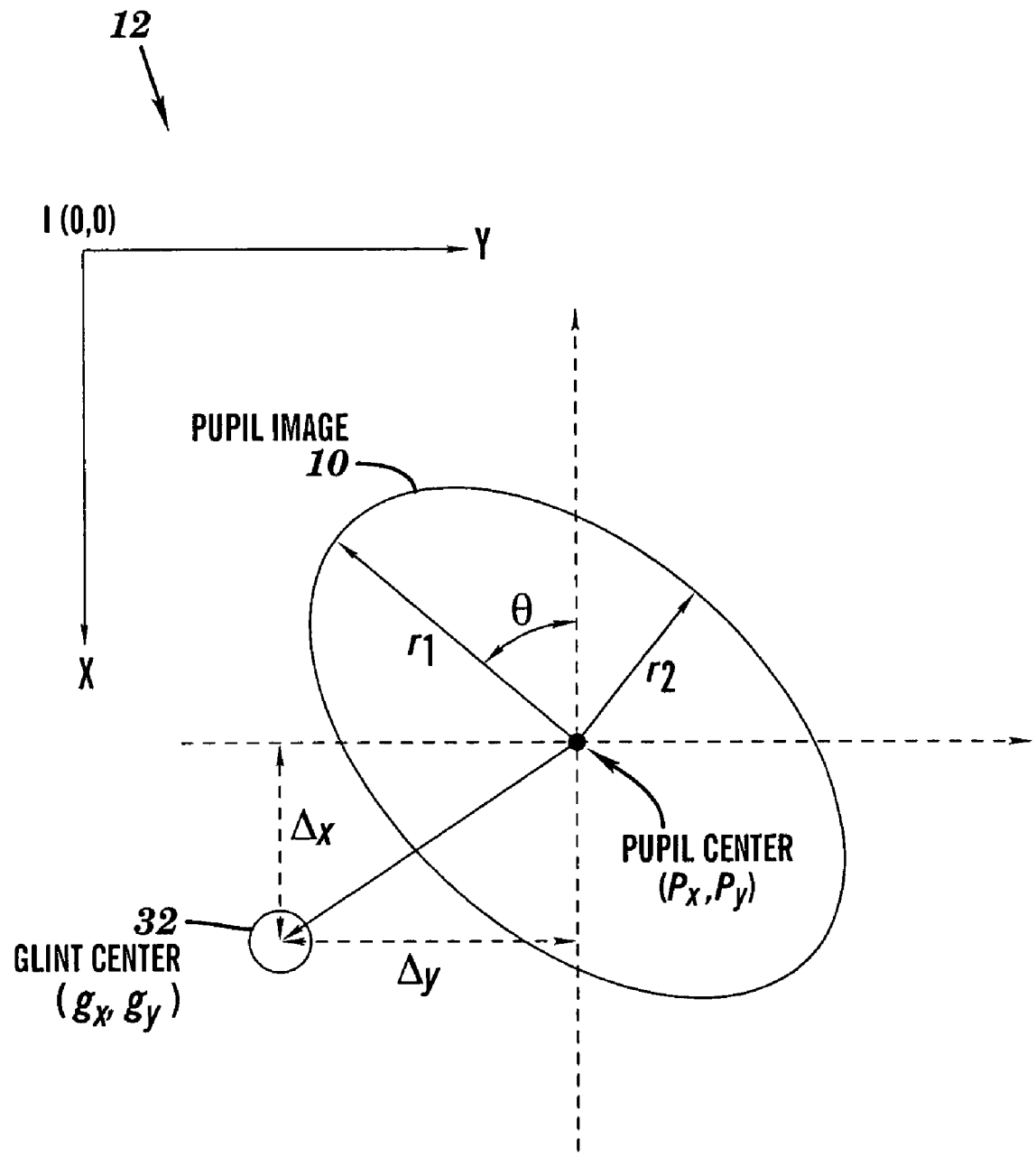
FIG. 9 depicts the image plane of FIG. 1 in greater detail, in accordance with embodiments of the present invention.

The mapping of the present invention exploits the relationships between face orientation and the above-mentioned pupil parameters. In order to define the pertinent pupil parameters of interest, FIG. 9 depicts the image plane 12 of FIG. 1 in greater detail in terms of an XY cartesian coordinate system in which the origin of coordinates is I(0,0), in accordance with embodiments of the present invention. In addition, FIG. 9 shows: the center of the pupil image ($p_x$, $p_y$), the glint center ($g_x$, $g_y$), the ratio (r) of major semi-axis dimension |$r_1$| to the minor semi-axis dimension |$r_2$| of the ellipse that is fitted to the pupil image 10, wherein the major and minor semi-axis vectors ($r_1$ and $r_2$, respectively) point outward from the pupil image center ($p_x$, $p_y$). FIG. 9 shows: the angular orientation θ of the major semi-axis vector relative to the −X direction, the projection Δx of pupil-glint displacement vector onto the +X axis, and the projection Δy of pupil-glint displacement vector onto the −Y axis. The pupil-glint displacement vector (G-P) starts at pupil center ($p_x$, $p_y$) and ends at glint center ($g_x$, $g_y$), wherein P denotes the pupil vector from I(0,0) to ($p_x$, $p_y$), and G denotes the glint vector from I(0,0) to ($g_x$, $g_y$). Therefore, (Δx, Δy) is calculated as ($g_x$-$p_x$, $g_y$-$p_y$).

Six parameters are chosen for the gaze calibration to obtain the mapping function, namely: Δx, Δy, r, θ, $g_x$, and $g_y$. The choice of these six factors is based on the following rationale. Δx and Δy account for the relative movement between the glint and the pupil, representing the local gaze. The magnitude of the glint-pupil vector (i.e., |G-P|) may also relate to the distance between the subject and the camera. The ratio (r) accounts for out-of-plane face rotation (i.e., rotation of the face with respect to the frontal direction). The ratio (r) is about 1 when the face is normal to the frontal direction. The ratio (r) exceeds 1 or is less than 1 when the face turns either up/down or left/right of the frontal direction. The angle θ is used to account for in-plane face rotation around the camera optical axis. Finally, ($g_x$, $g_y$) is used to account for the in-plane head translation.

The use of these six parameters accounts for both head and pupil movement. This effectively reduces the head movement influence. Furthermore, the input parameters are chosen such that they remain relatively invariant for different people. For example, these parameters are independent of the size of the pupils, which often vary among people. This effectively eliminates the need to re-calibrate for another person.

The preceding six parameters affecting gaze are used to determine the mapping function that maps an eye parameter vector to the actual gaze (i.e., to the screen coordinates of the gaze). The eye parameter vector comprises the preceding six parameters. The present invention uses neural networks to determine the mapping function in order to avoid the difficulty in analytically deriving the mapping function under different face poses and for different persons.

Specht introduced generalized regression neural networks (GRNNs) in 1991 as a generalization of both radial basis function networks and probabilistic neural networks. See Specht, D. F., *A general regression neural network*, IEEE Transactions on Neural Networks, 2:568-576 (1991). GRNNs have been successfully used in various function approximation applications. GRNNs are memory-based feed forward networks based on the estimation of probability density functions (PDFs). The mapping used by the present invention employs GRNNs.

GRNNs feature fast training times, can readily model non-linear functions, and perform well in noisy environments given enough data. Experiments performed by the inventors of the present invention with different types of neural networks reveal superior performance of GRNN over the conventional feed forward back propagation neural networks.

GRNN is non-parametric estimator. Therefore, it is not necessary to assume a specific functional form. Rather, GRNN allows the appropriate form to be expressed as a probability density function that is empirically determined from the observed data using Parzen window estimation. See Parzen, E., *On estimation of a probability density function and mode*, Annals Mathematical Statistics, 33:1065-1076 (1962). Thus, the approach is not limited to any particular functional form and requires no prior knowledge of an approximate functional form of the mapping.

Let X represent the following eye parameter vector of measured eye parameters $X_j$ (j=1, 2, . . . , 6):

$$X=[\Delta x \Delta y\ r \theta g_x g_y]$$

GRNN assumes that the mapped gaze value Z relates to X by their joint Probability Density Function $f(X,Z)$. If $f(X,Z)$ is known, then the conditional gaze value Z (i.e., the regression of Z on X) is defined as follows:

$$Z(X) = \frac{\int_{-\infty}^{+\infty} Z f(X, Z) dZ}{\int_{-\infty}^{+\infty} f(X, Z) dZ} \tag{1}$$

In practice, $f(X,Z)$ is typically not known and is estimated from a sample of observations of X and Z. The sample observations of X and Z are denoted as $X_i$ and $Z_i$, respectively (I=1,2, . . . , n) wherein n is the total number of sample observations. Using GRNN, $f(X,Z)$ is estimated by the non-parametric Parzen's method:

$$\hat{f}(X, Z) = \frac{1}{n(2\pi)^{(p+1)/2}\sigma^{(p+1)}} \sum_{i=1}^{n} \exp\left(-\frac{D_i^2}{2\sigma^2}\right) \cdot \exp\left(-\frac{(Z - Z_i)^2}{2\sigma^2}\right) \tag{2}$$

$$D_i^2 = (x - x_i)^T (x - x_i) \tag{3}$$

where p is the dimension of the input vector X, and Z is a two-dimensional vector whose components are the coordinates of the gaze point on the screen. A physical interpretation of the probability estimate $\hat{f}(X,Z)$ is that it assigns a sample probability of width σ for each sample $X_i$ and $Z_i$, and the probability estimate $\hat{f}(X,Z)$ is proportional to the sum of said sample probabilities over the n samples.

Substituting Equation (2) into Equation (1) results in the following regression equation:

$$\hat{Z}(X) = \frac{\sum_{i=1}^{n} Z_i \exp\left(-\frac{D_i^2}{2\sigma^2}\right)}{\sum_{i=1}^{n} \exp\left(-\frac{D_i^2}{2\sigma^2}\right)} \tag{4}$$

or $$\hat{Z}(X) = \frac{\sum_{i=1}^{n} Z_i \omega_i}{\sum_{i=1}^{n} \omega_i} \quad (5)$$

$$\omega_i = \exp\left(-\frac{D_i^2}{2\sigma^2}\right) \quad (6)$$

where $\omega_i$ can be viewed as the "weight" of $Z_i$ in Equation (5). Therefore, the estimate gaze $\hat{Z}(x)$ in Equation (4) is a weighted average of all of the observed gaze values $Z_i$, where each observed gaze value $Z_i$ is weighted exponentially according to the Euclidean distance from its observed eye parameter vector $X_i$ to X. The denominator in Equations (4) and (5) is a normalization constant.

The only free (adaptive) parameter in Equation (4) is $\sigma$, which defines the "bandwidth" of Gaussian kernel $\exp[(Z-Z_i)^2/(2\sigma^2)]$. When the underlying probability density function is not known, $\sigma$ may be determined empirically. The larger that $\sigma$ is, the smoother the function approximation will be. To fit the data closely, a $\sigma$ a smaller than the typical Euclidian distance between input vectors $X_i$ may be used. To fit the data more smoothly, a $\sigma$ larger than the typical Euclidian distance between input vectors $X_i$ may be used. During GRNN training, $\sigma$ may be adjusted repeatedly until good performance is achieved. For example during training, $\sigma$ may be varied such that the "accuracy" of the mapping (e.g., see Tables 1 and 3, discussed infra) is determined as a function of $\sigma$. The accuracy may be an average accuracy, a weighted average accuracy, a minimum accuracy, etc. Typically for sufficiently small $\sigma$, the accuracy is a monotonically increasing function of $\sigma$, so that the accuracy increases as $\sigma$ increases until a peak (i.e., maximum) accuracy is determined. As $\sigma$ is further increased from the peak-accuracy $\sigma$, the accuracy is a monotonically decreasing function of $\sigma$. Thus one may choose the $\sigma$ that corresponds to the peak accuracy. The preceding procedure for determining the dependence of the accuracy on $\sigma$, and the $\sigma$ associated with the peak accuracy, may be performed by trial and error, or in an automated manner using an algorithm that varies $\sigma$ and computes the accuracy as a function of $\sigma$ through execution of a computer code.

The resulting regression equation (4) can be implemented in a parallel, neural-like structure. Since the parameters of the neural-like structure are determined empirically from test data rather than iteratively, the neural-like structure "learns" and can begin to generalize immediately.

Note that the mapping described by Equation (4) exists independently for the $X_{SG}$ coordinate of the gaze point 16 (see FIG. 1) and the $Y_{SG}$ coordinate of the gaze point 16 of the computer screen 128 (see FIG. 1). Thus, Z is a scalar which stands for standing for either the $X_{SG}$ coordinate or the $Y_{SG}$ coordinate. Therefore, there are two sets of Equations (1)-(6): a first set of Equation (1)-(6) for the $X_{SG}$ coordinate mapping; and a second set of Equations (1)-(6) for the $Y_{SG}$ coordinate mapping. For the first set of equations, Equation (4) is a first mapping function that estimates $X_{SG}$ and utilizes a first probability density function having a first Gaussian kernel characterized by a first width $\sigma_1$. For the second set of equations, Equation (4) is a second mapping function that estimates $Y_{SG}$ and utilizes a second probability density function having a second Gaussian kernel characterized by a second width $\sigma_1$. Both $\sigma_1 = \sigma_2$ and $\sigma_1 \neq \sigma_2$ are within the scope of the present invention.

Figure 10:
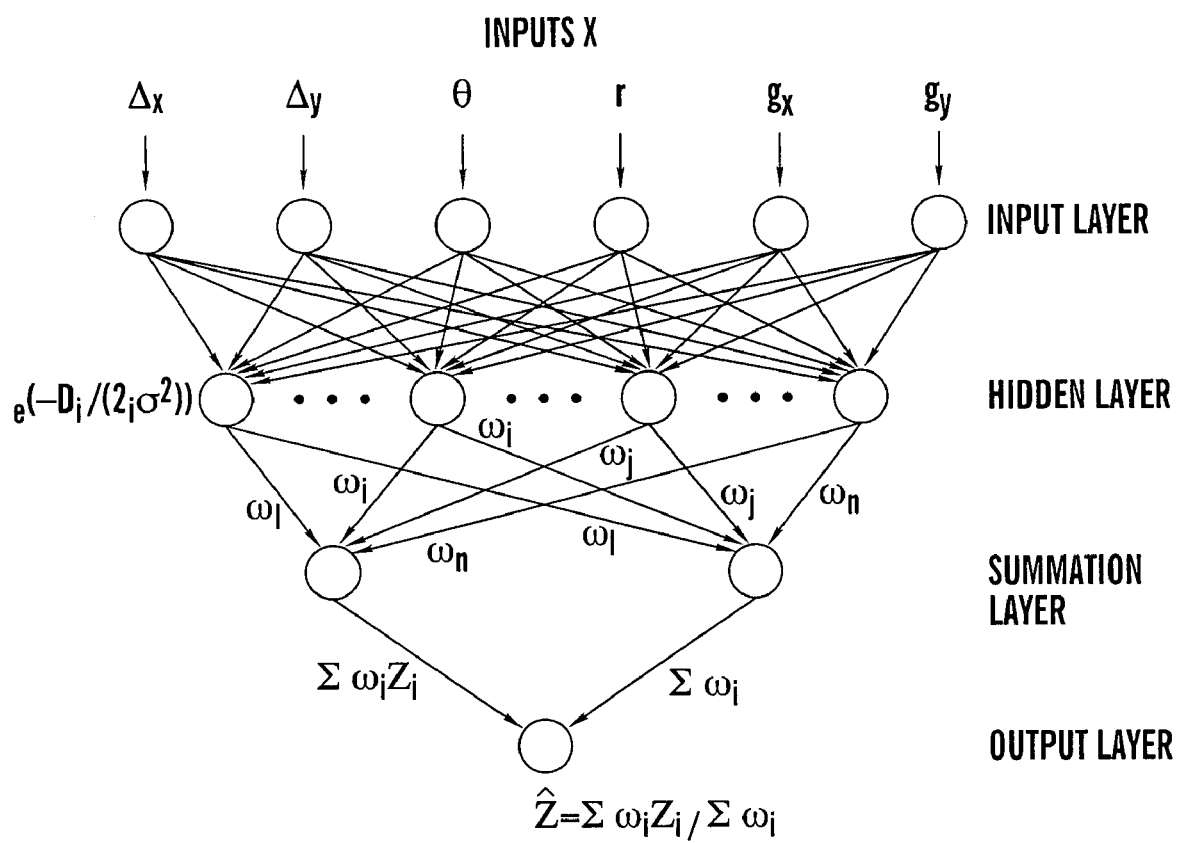
FIG. 10 depicts the generalized regression neural network (GRNN) architecture of the calibration procedure associated with the mapping of an eye parameter vector into screen coordinates, in accordance with embodiments of the present invention.

FIG. 10 depicts the GRNN architecture of the calibration procedure associated with the mapping of the eye parameter vector into screen coordinates, in accordance with embodiments of the present invention. As seen in FIG. 10, the designed GRNN topology comprises 4 layers: the input layer, the hidden layer, the summation layer, and the output layer.

The input layer has the six inputs, namely the six parameters from the $X_i$ vector as shown in FIG. 10. Thus, the number of nodes in the input layer is p (i.e., the dimension of the $X_i$ input vector).

The six inputs of a given input vector $X_i$ are fed into the six input nodes on a one-to one basis and then into a single hidden node of the hidden layer. Thus, each hidden node receives all six inputs of a unique input vector $X_i$. Accordingly, the number of hidden nodes is equal to the number (n) of training samples such that one hidden node is added for each new input vector $X_i$ of the training sample. Each node in the hidden layer includes an activation function which may be expressed in exponential form. Given an input vector X, the ith node in the hidden layer subtracts X from $X_i$, producing $D_i$, which is then processed by the activation function to produce the weight $\omega_i$ (see Equation. 6). The weight $\omega_i$ is the output of the ith hidden node, which is passed to the nodes in the summation layer. The number of nodes in the summation layer is equal to the number of output nodes plus 1. The first node in the summation layer performs the sum of all gaze $Z_i$, weighted by the corresponding $\omega_i$, i.e, $$\sum_{i=1}^{n} Z_i \omega_i.$$

The second node in the summation layer performs the sum of $$\sum_{i=1}^{n} \omega_i.$$

The two outputs of the summation layer feed to the output node, which divides $$\sum_{i=1}^{n} Z_i \omega_i \text{ by } \sum_{i=1}^{n} \omega_i$$

to generate the estimated gaze $\hat{Z}$ shown in Equation (5).

The first mapping function of Equation (4) for the $X_{SG}$ coordinate is calibrated with the n calibration data samples, and the second mapping function of Equation (4) for the $Y_{SG}$ coordinate is calibrated with the n data samples, wherein n is at least 2. In summary, the generalized regression neural network architecture of the first and second mapping functions includes an input layer having 6 nodes, a hidden layer coupled to the input layer and having n nodes, a summation layer coupled to the hidden layer and having 2 nodes, and an output layer coupled to the summation layer and having 1 node.

The parameters to use for the input layer vary with different face distances and orientations to the camera. The input eye parameter vector $$X=[\Delta x \Delta y\ r\theta_x g_y]$$

is normalized appropriately before being supplied to the GRNN procedure. The normalization ensures that all input features are of the same order of magnitude. A large amount of training data under different head positions is collected to train the GRNN.

During the training data acquisition implemented by the inventors of the present invention, the subject is asked to fixate his/her gaze on each gaze region (e.g., the 8 gaze regions depicted in FIG. 5). For each fixation, 10 sets of the 6 input parameters are collected so that outliers can be identified subsequently. Furthermore, to collect representative data, one subject from each of various races is used, including an Asian subject and a Caucasian subject. The subjects' ages range from 25 to 65. The acquired training data, after appropriate preprocessing (e.g., non-linear filtering to remove outliers) and normalization, is then used to train the neural network to obtain the weights of the GRNN. The GRNNs are trained using a one-pass learning algorithm and the training is therefore very fast.

Figure 11:
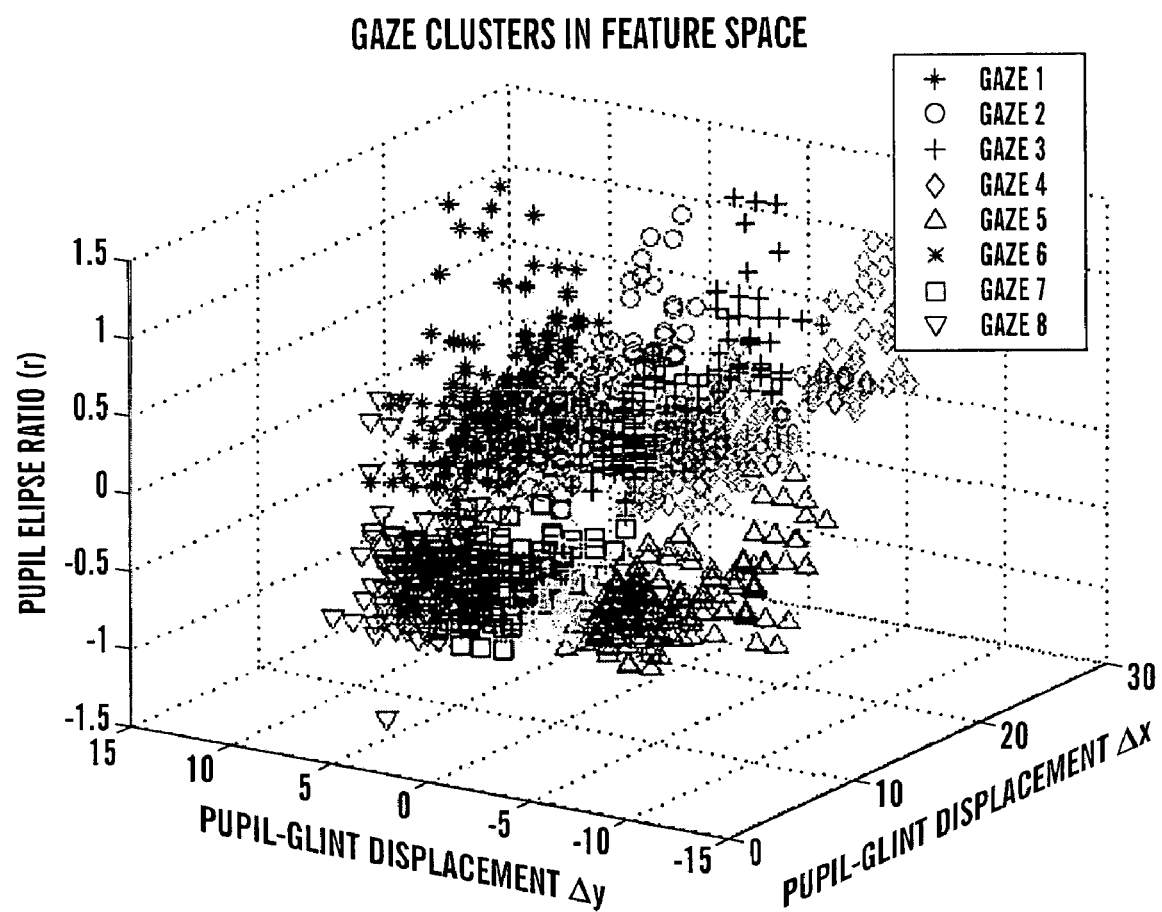
FIG. 11 is a graphical plot of gaze screen-region clusters in a three-dimensional space, in accordance with embodiments of the present invention.

After training, given an input vector, the GRNN can then classify the input vector into one of the 8 screen regions of FIG. 5. FIG. 11 is a graphical plot of gaze screen-region clusters in a three-dimensional space defined by input parameters $\Delta x$, $\Delta y$, and r. FIG. 11 shows that there are distinctive clusters of different gazes in the depicted three-dimensional parameter space. The clusters would be more localized if the plot were instead in a six-dimensional parameter space defined by all 6 input parameters of the X vector. Although the clusters of different gaze regions in the gaze parameters are distinctive, the clusters sometimes overlap. The overlap of clusters that occurs mostly for gaze regions that are spatially adjacent to each other. Thus, gaze misclassifications may occur, as may be seen in Table 1.

TABLE 1

Whole Classifier Alone.

| True Screen Region | Number of Estimates of Each Screen Region Below | | | | | | | | Accuracy (%) |
|---|---|---|---|---|---|---|---|---|---|
| | 1 | 2 | 3 | 4 | 5 | 6 | 7 | 8 | |
| 1 | 49 | 11 | 0 | 0 | 0 | 0 | 0 | 0 | 82 |
| 2 | 0 | 52 | 8 | 0 | 0 | 0 | 0 | 0 | 87 |
| 3 | 0 | 0 | 46 | 14 | 0 | 0 | 0 | 0 | 77 |
| 4 | 0 | 0 | 0 | 59 | 1 | 0 | 0 | 0 | 98 |
| 5 | 0 | 0 | 0 | 0 | 60 | 0 | 0 | 0 | 100 |
| 6 | 0 | 0 | 0 | 6 | 8 | 46 | 0 | 0 | 77 |
| 7 | 0 | 0 | 2 | 0 | 0 | 5 | 53 | 0 | 88 |
| 8 | 4 | 0 | 0 | 0 | 0 | 0 | 6 | 50 | 84 |

The data of Table 1 reflects experiments in which the subject was instructed to gaze at a cursor located in one of the 8 regions shown in FIG. 5. The cursor was generated by a laser pointer which points to different locations in regions of the computer screen. As expected, the user gaze was able to accurately follow the movement of the laser pointer, which moves randomly from one gaze region to another gaze region, even under natural head movement. Different face orientations and distances to the cameras with different subjects were implemented in the experiments.

The regions which the subject was instructed to gaze at are shown in the "True Screen Region" column of Table 1. Applying Equation (4) independently to both the $X_{SG}$ and $Y_{SG}$ coordinates (see FIG. 1), the gaze mapping of the present invention generated the estimated noted under "Number of Estimates of Each Screen Region Below." For example, the subjects were instructed to gaze at the cursor in region 1 a total of 60 times, and the mapping algorithm of Equation (4) performed a correct classification 49 times by correctly estimating the gaze point to be in region 1, and the mapping algorithm performed an incorrect classification 11 times by incorrectly estimating the gaze point to be in region 2, which represents an accuracy of 82% (i.e., 49/60).

Table 1 shows the results of 480 test gazes not included in the training data used to develop Equation (4). The average accuracy of the classification, as shown in Table 1, is 85%. An analysis of Table 1 shows that the misclassifications occur almost exclusively between nearest-neighbor gaze regions or screen areas. For example, about 18% of the gazes in gaze region 1 are misclassified to gaze region 2, and about 23% of the gazes for gaze region 3 are misclassified as gaze region 4.

To reduce misclassification among neighboring gaze classes, a hierarchical classifier was designed to perform additional classification. The idea is to focus on the gaze regions that tend to get misclassified and perform reclassification for these regions. As explained supra in conjunction with Table 1, the misclassified regions are essentially the nearest-neighboring regions to the "gaze region" having the cursor which the subject was instructed to gaze at. Therefore, a sub-classifier was designed for each gaze region to perform the neighboring classification again. According to the regions defined in FIG. 5, the neighbors are first identified for each gaze region and then the only training data used for the gaze region is the training data that is specific to the gaze region and its nearest neighbors. Specifically, each gaze region and its nearest neighbors are identified in Table 2.

TABLE 2

| Gaze Region | Nearest Neighbors |
|---|---|
| 1 | 2, 8 |
| 2 | 1, 3, 7 |
| 3 | 2, 4, 6 |
| 4 | 3, 5 |
| 5 | 4, 6 |
| 6 | 3, 5, 7 |
| 7 | 2, 4, 6 |
| 8 | 1, 7 |

Figure 12:
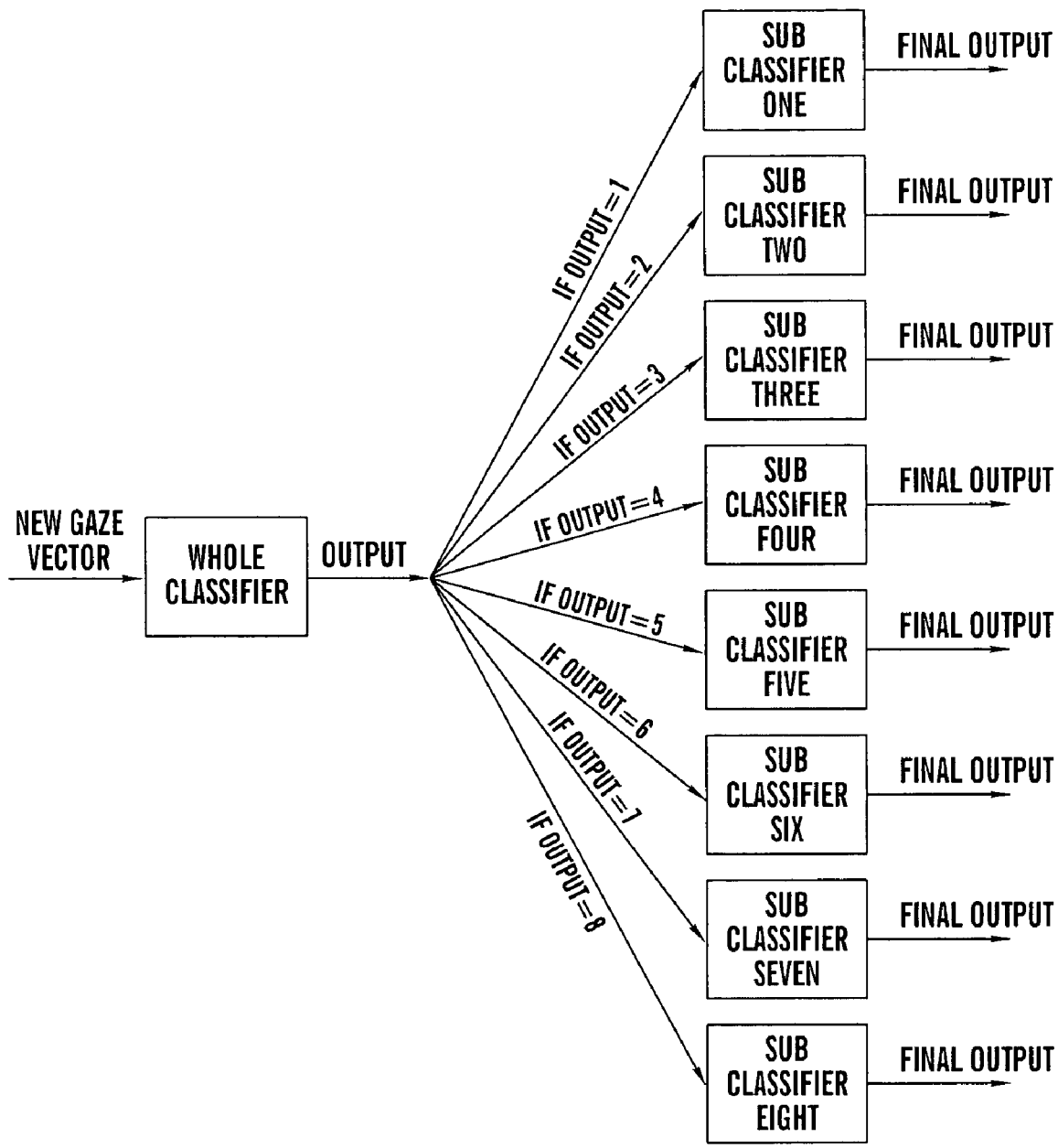
FIG. 12 depicts a hierarchical gaze classifier, in accordance with embodiments of the present invention.

When all of the training data for is utilized to develop Equation (4), the procedure is said to use the "whole classifier." When Equation (4) is selectively developed for application to a given region such that the only gaze regions used to develop Equation (4) are the nearest neighbors to the given region, then the procedure is said to use a "sub-classifier" pertaining to the neighbors. The sub-classifiers are then trained using the training data consisting of the neighbors' regions only. The sub-classifiers are subsequently combined with the whole-classifier to construct a hierarchical gaze classifier as shown as FIG. 12, in accordance with embodiments of the present invention. Given an input vector (i.e., the "New Gaze Vector" of FIG. 12), the hierarchical gaze classifier of the present invention works as follows. First, the whole classifier classifies the input vector into one of the eight gaze regions or screen areas. Then, according to the classified region, the corresponding sub-classifier is activated to reclassify the input vector to the gaze regions covered by the sub-classifier. The sub-classifier correlates to the Gaze Region and its Nearest Neighbors of Table 2. The output obtained from use of the sub-classifier is the final classified output region. As an example, assume that the new gaze vector truly relates to region 2. If the whole classifier classifies the new gaze vector into region 2 (i.e., output=2), then Sub-classifier Two is used which correlates to Gaze Region 2 of Table 2, so that the sub-classifier uses Equation (4) for only regions 2, 1, 3, and 7. Alternatively, if the whole classifier classifies the new gaze vector into region 1 (i.e., output=1), then Sub-classifier One is used which correlates to Gaze Region 1 of Table 2, so that the sub-classifier uses Equation (4) for only regions 1, 2, and 8. . Alternatively, if the whole classifier classifies the new gaze vector into region 3 (i.e., output=3), then Sub-classifier Three is used which correlates to Gaze Region 3 of Table 2, so that the sub-classifier uses Equation (4) for only regions 3, 2, 4, and 6. Alternatively, if the whole classifier classifies the new gaze vector into region 7 (i.e., output=7), then Sub-classifier Seven is used which correlates to Gaze Region 1 of Table 2, so that the sub-classifier uses Equation (4) for only regions 7, 2, 4, and 6. The results of combining the sub-classifiers with the whole-classifier for the same raw data of Table 1 are shown in Table 3.

TABLE 3

Hierarchical Gaze Classifier.

| True Screen Region | Number of Estimates of Each Screen Region Below | | | | | | | | Accuracy (%) |
|---|---|---|---|---|---|---|---|---|---|
| | 1 | 2 | 3 | 4 | 5 | 6 | 7 | 8 | |
| 1 | 55 | 5 | 0 | 0 | 0 | 0 | 0 | 0 | 92 |
| 2 | 0 | 58 | 2 | 0 | 0 | 0 | 0 | 0 | 97 |
| 3 | 0 | 0 | 57 | 3 | 0 | 0 | 0 | 0 | 95 |
| 4 | 0 | 0 | 0 | 59 | 1 | 0 | 0 | 0 | 98 |
| 5 | 0 | 0 | 0 | 0 | 60 | 0 | 0 | 0 | 100 |
| 6 | 0 | 0 | 1 | 5 | 5 | 49 | 0 | 0 | 82 |
| 7 | 0 | 0 | 2 | 0 | 0 | 5 | 53 | 0 | 88 |
| 8 | 3 | 0 | 0 | 0 | 0 | 0 | 2 | 55 | 92 |

Table 3 shows an average accuracy of about 95% with the hierarchical gaze classifier as compared with the 85% accuracy achieved with use of the whole classifier alone. The misclassification rate between nearest neighboring gaze regions 1 and 2 was reduced from 18% to about 8%, while the misclassification rate between nearest neighboring gaze regions 3 and 4 was reduced to about 5% from the previous 24%. The classification errors for other gaze regions have also improved or remained unchanged. Thus, the hierarchical gaze classifier provides a significant improvement in accuracy achieved as compared with use of the whole classifier alone.

The preceding experiments show that the mapping of the present invention, working in with an image resolution of 640×480, allows about 6 inches left/right and up/down head translational movement, and allows ±20 degrees left/right head rotation as well as ±15 degrees up/down rotation. The distance from the subject to the camera ranges from 3.5 feet to 5 feet. The spatial gaze resolution is about 5 degrees horizontally and 8 degrees vertically, which corresponds to about 4 inches horizontally and 5 inches vertically at a distance about 4 feet away from the screen.

Figure 13:
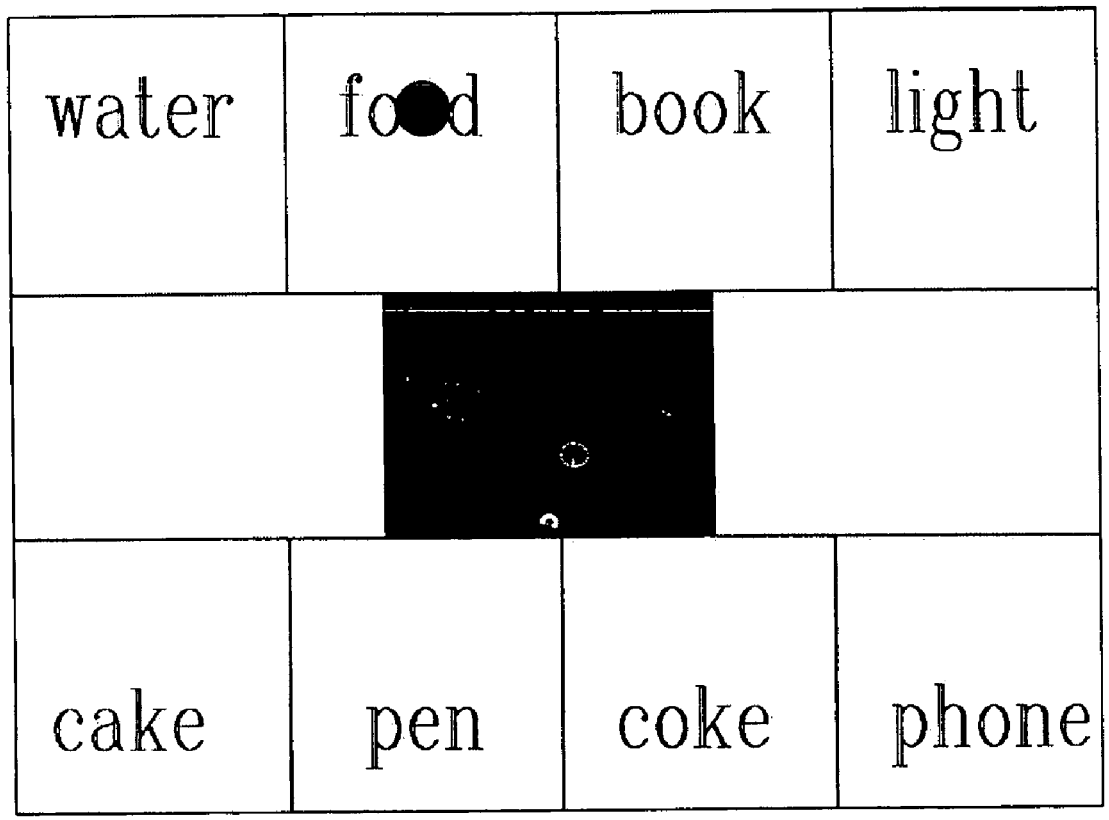
FIG. 13 shows regions of a computer screen with labeled words, in accordance with embodiments of the present invention.

The gaze tracker of the present invention may be utilized for natural user computer interaction. For this experiment, the screen is divided into 2×4 regions, with each region labeled with a word such as "water" or "phone" to represent the user's intention or needs. FIG. 13 shows the regions of the computer screen with labeled words, in accordance with embodiments of the present invention. During the experiment, the user sits in front of the computer naturally and gazes at different region of the screen. If the user's gaze fixation at a region exceeds a predefined threshold time interval, an audio sound is uttered by a speaker to express the user intention as determined by the labeled word of the gazed region. For example, if the user gazes at the region that contains the word "water" for more than the predefined threshold time interval, then the speaker will utter: "Please bring me a cup of water." This experiment repeats until the user decides to quit.

Compared with the existing gaze tracking methods, the gaze tracker of the present invention provides many benefits, including: no recalibration is necessary after an initial calibration is performed, natural head movement is permitted, the inventive method is completely non-intrusive and unobtrusive while still producing relatively robust and accurate gaze tracking. The improvement results from using a new gaze calibration procedure based on GRNN. With GRNN, an analytical gaze mapping function is not assumed and head movements are accounted for in the mapping. The use of a hierarchical classification schemes further improves the gaze classification accuracy. The gaze tracker of the present invention is expected to be used in many applications including, inter alia, smart graphics, human computer interaction, non-verbal communications via gaze, and assisting people with disabilities.

Figure 14:
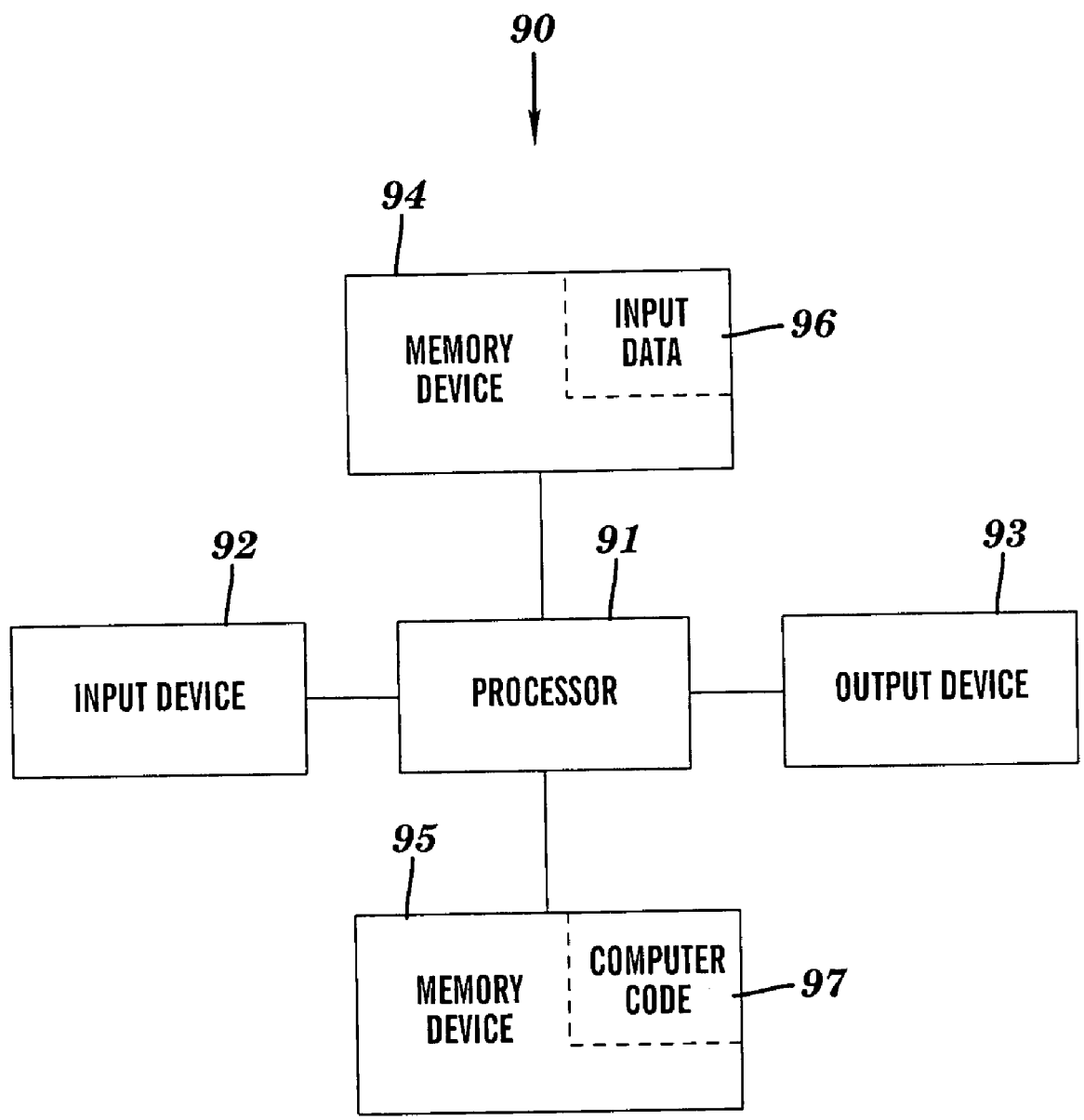
FIG. 14 illustrates a computer system used for gaze tracking, in accordance with embodiments of the present invention.

FIG. 14 illustrates a computer system 90 used for tracking gaze, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes an algorithm for tracking gaze. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 14) may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

While FIG. 14 shows the computer system 90 as a particular configuration of hardware and software, any configuration of hardware and software, as would be known to a person of ordinary skill in the art, may be utilized for the purposes stated supra in conjunction with the particular computer system 90 of FIG. 14. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for tracking eye gaze, comprising the steps of:
focusing a single camera on an eye of subject viewing a gaze point on a screen while directing light toward the eye;
sampling eye gaze data pertaining to a glint and pupil image of the eye in an image plane of the single camera;
determining eye gaze parameters from the eye gaze data, wherein the eye gaze parameters include: $\Delta x$, $\Delta y$, r, $\theta$, $g_x$, and $g_y$, wherein $\Delta x$ and $\Delta y$ are orthogonal projections of a pupil-glint displacement vector directed from the center of the pupil image to the center of the glint in the image plane, wherein r is a ratio of a major semi-axis dimension to a minor semi-axis dimension of an ellipse that is fitted to the pupil image in the image plane, wherein $\theta$ is an angular orientation of the major semi-axis dimension in the image plane, and wherein $g_x$, and $g_y$ are mutually orthogonal coordinates of the center of the glint in the image plane; and
estimating the gaze point from the eye gaze parameters.

2. The method of claim 1, wherein the gaze point is characterized by orthogonal coordinates $X_{SG}$ and $Y_{SG}$ in the coordinate system of the screen, and wherein the estimating step comprises estimating $X_{SG}$ and $Y_{SG}$ independently.

3. The method of claim 2, wherein estimating $X_{SG}$ utilizes a first mapping function based on a generalized regression neural network architecture, and wherein estimating $Y_{SG}$ utilizes a second mapping function based on the generalized regression neural network architecture.

4. The method of claim 3, wherein the first mapping function utilizes a first probability density function having a first Gaussian kernel characterized by a first width $\sigma_1$, and wherein the second mapping function utilizes a second probability density function having a second Gaussian kernel characterized by a second width $\sigma_2$.

5. The method of claim 4, wherein $\sigma_1 = \sigma_2$.

6. The method of claim 4, wherein $\sigma_1 \neq \sigma_2$.

7. The method of claim 3, wherein the first mapping function is calibrated with n calibration data samples, wherein the second mapping function is calibrated with the n data samples, and wherein n is at least 2.

8. The method of claim 7, wherein the generalized regression neural network architecture of the first and second mapping functions includes an input layer having 6 nodes, a hidden layer coupled to the input layer and having n nodes, a summation layer coupled to the hidden layer and having 2 nodes, and an output layer coupled to the summation layer and having 1 node.

9. The method of claim 7, wherein the method further comprises the steps of:
partitioning the screen into a two-dimensional array of screen areas; and
classifying a vector of the eye gaze parameters into a screen area of the screen areas.

10. The method of claim 7, wherein the classifying step comprises:
classifying the vector of the eye gaze parameters into a first screen area of the screen areas, using a whole classifier;
determining nearest neighbor screen areas of the first screen area; and
reclassifying the vector of the eye gaze parameters into the screen area, using a sub-classifier pertaining to the nearest neighbor screen areas.

11. The method of claim 10, wherein the method further comprises assigning the estimated gaze point to a region of the screen that has an area of about ⅛ of the area of the screen, wherein said assigning has an average accuracy of at least about 95% even if any of the following head motions of the subject occur during the focusing step: up to 6 inches of left/right head translation, up to 6 inches of up/down head translation movement, up to ±20 degrees of left/right head rotation, and up to ±15 degrees of up/down head rotation.

12. The method of claim 7, wherein the method further comprises assigning the estimated gaze point to a region of the screen that has an area of about ⅛ of the area of the screen, wherein said assigning has an average accuracy of at least about 85% even if any of the following head motions of the subject occur during the focusing step: up to 6 inches of left/right head translation, up to 6 inches of up/down head translation movement, up to ±20 degrees of left/right head rotation, and up to ±15 degrees of up/down head rotation.

13. The method of claim 1, wherein no camera other than the single camera is focused on the eye during the focusing step.

14. A computer system comprising a processor and a computer readable memory unit coupled to the processor, said memory unit containing instructions that when executed by the processor implement a method for tracking eye gaze, said method comprising the computer implemented steps of:
processing eye gaze data pertaining to a glint and pupil image of an eye in an image plane of a single camera, wherein the eye is comprised by a subject, and wherein the single camera is focused on the eye while the eye is viewing a gaze point on a screen and while light is directed toward the eye;
determining eye gaze parameters from the eye gaze data, wherein the eye gaze parameters include: $\Delta x$, $\Delta y$, r, $\theta$, $g_x$, and $g_y$, wherein $\Delta x$ and $\Delta y$ are orthogonal projections of a pupil-glint displacement vector directed from the center of the pupil image to the center of the glint in the image plane, wherein r is a ratio of a major semi-axis dimension to a minor semi-axis dimension of an ellipse that is fitted to the pupil image in the image plane, wherein $\theta$ is an angular orientation of the major semi-axis dimension in the image plane, and wherein $g_x$, and $g_y$ are mutually orthogonal coordinates of the center of the glint in the image plane; and
estimating the gaze point from the eye gaze parameters.

15. The computer system of claim 14, wherein the gaze point is characterized by orthogonal coordinates $X_{SG}$ and $Y_{SG}$ in the coordinate system of the screen, and wherein the estimating step comprises estimating $X_{SG}$ and $Y_{SG}$ independently.

16. The computer system of claim 15, wherein estimating $X_{SG}$ utilizes a first mapping function based on a generalized regression neural network architecture, and wherein estimating $Y_{SG}$ utilizes a second mapping function based on the generalized regression neural network architecture.

17. The computer system of claim 16, wherein the first mapping function utilizes a first probability density function having a first Gaussian kernel characterized by a first width $\sigma_1$, and wherein the second mapping function utilizes a second probability density function having a second Gaussian kernel characterized by a second width $\sigma_2$.

18. The computer system of claim 17, wherein $\sigma_1 = \sigma_2$.

19. The computer system of claim 17, wherein $\sigma_1 \neq \sigma_2$.

20. The computer system of claim 16, wherein the first mapping function is calibrated with n calibration data samples, wherein the second mapping function is calibrated with the n data samples, and wherein n is at least 2.

21. The computer system of claim 20, wherein the generalized regression neural network architecture of the first and second mapping functions includes an input layer having 6 nodes, a hidden layer coupled to the input layer and having n nodes, a summation layer coupled to the hidden layer and having 2 nodes, and an output layer coupled to the summation layer and having 1 node.

22. The computer system of claim 20, wherein the method further comprises the steps of:
partitioning the screen into a two-dimensional array of screen areas; and
classifying a vector of the eye gaze parameters into a screen area of the screen areas.

23. The computer system of claim 20, wherein the classifying step comprises:
classifying the vector of the eye gaze parameters into a first screen area of the screen areas, using a whole classifier;
determining nearest neighbor screen areas of the first screen area; and
reclassifying the vector of the eye gaze parameters into the screen area, using a sub-classifier pertaining to the nearest neighbor screen areas.

24. The computer system of claim 23, wherein the method further comprises assigning the estimated gaze point to a region of the screen that has an area of about 1/8 of the area of the screen, wherein said assigning has average accuracy of at least about 95% even if any of the following head motions of the subject occur during the focusing step: up to 6 inches of left/right head translation, up to 6 inches of up/down head translation movement, up to ±20 degrees of left/right head rotation, and up to ±15 degrees of up/down head rotation.

25. The computer system of claim 20, wherein the method further comprises assigning the estimated gaze point to a region of the screen that has an area of about 1/8 of the area of the screen, wherein said assigning has average accuracy of at least about 85% even if any of the following head motions of the subject occur during the focusing step: up to 6 inches of left/right head translation, up to 6 inches of up/down head translation movement, up to ±20 degrees of left/right head rotation, and up to ±15 degrees of up/down head rotation.

26. The computer system of claim 14, wherein no camera other than the single camera is focused on the eye during the focusing step.

* * * * *

UNITED STATES PATENT AND TRADEMARK OFFICE
CERTIFICATE OF CORRECTION

PATENT NO.        : 7,306,337 B2                                           Page 1 of 1
APPLICATION NO.   : 10/787359
DATED             : December 11, 2007
INVENTOR(S)       : Ji et al.

It is certified that error appears in the above-identified patent and that said Letters Patent is hereby corrected as shown below:

On the Front Page
Column 2, under *Attorney, Agent or Firm*, delete "Olson" and insert -- Olsen --

Column 12
Line 5, delete "estimated noted" and insert -- estimated regions denoted --
Line 52, delete "for"
Line 58, delete "the neighbors" and insert -- the nearest neighbors --

Signed and Sealed this

Sixth Day of May, 2008

JON W. DUDAS
*Director of the United States Patent and Trademark Office*